(12) United States Patent
Hasselgruber et al.

(10) Patent No.: US 6,578,899 B2
(45) Date of Patent: Jun. 17, 2003

(54) CONVERTIBLE VEHICLE

(75) Inventors: Andreas Hasselgruber, Eberdingen-Nussdorf (DE); Matthias Rösler, Stuttgart (DE); Wolfram Salz, Vaihingen/Enz (DE); Thomas Halbweiss, Marbach (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/117,066

(22) Filed: Apr. 1, 2002

(65) Prior Publication Data
US 2002/0140250 A1 Oct. 3, 2002

(30) Foreign Application Priority Data

Apr. 3, 2001 (DE) .......................................... 101 16 613

(51) Int. Cl.$^7$ .............................. B62D 25/10; B60J 5/10
(52) U.S. Cl. .......................... 296/107.08; 296/107.16; 296/76; 296/146.11; 296/146.12; 49/246
(58) Field of Search ....................... 296/107.08, 107.16, 296/107.17, 76, 136, 146.11, 146.12; 49/249, 246, 381; 16/233, 235

(56) References Cited

U.S. PATENT DOCUMENTS

| | | | |
|---|---|---|---|
| 2,845,299 A | | 7/1958 | Pickering |
| 5,823,606 A | * | 10/1998 | Schenk et al. ......... 296/107.08 |
| 6,193,300 B1 | * | 2/2001 | Nakatomi et al. ...... 296/107.08 |
| 6,352,298 B1 | * | 3/2002 | Hayashi et al. ........ 296/107.08 |
| 2002/0011739 A1 | * | 1/2002 | Nicastri ................. 296/107.08 |
| 2002/0093218 A1 | * | 7/2002 | Weissmueller et al. 296/107.08 |

FOREIGN PATENT DOCUMENTS

| | | |
|---|---|---|
| DE | 197 49 552 | 5/1999 |
| DE | 298 00 066 | 6/1999 |
| DE | 198 00 156 | 7/1999 |
| DE | 298 02 871 | 7/1999 |
| DE | 199 48 746 | 4/2000 |
| DE | 10052001 | * 5/2002 |
| EP | 0 949 103 | 10/1999 |
| JP | 2001-113953 | * 4/2001 |

* cited by examiner

Primary Examiner—D. Glenn Dayoan
Assistant Examiner—H. Gutman
(74) Attorney, Agent, or Firm—Klaus J. Bach

(57) ABSTRACT

In a convertible vehicle including a roof which is movable between a closed position, in which the roof covers an interior vehicle space, and an open position, in which the roof is deposited in a storage compartment behind the passenger compartment of the vehicle, that is covered by a rear lid, an operating mechanism for opening and closing the rear lid is provided which includes front and rear pivot arms pivotally mounted to the vehicle body, a coupling arm pivotally connected to the pivot arms and first and second links, each of which has one end pivotally connected to the rear lid and the first link is pivotally connected with its other end to the coupling arm while the second link forms an extension of the rear pivot arm.

8 Claims, 1 Drawing Sheet

CONVERTIBLE VEHICLE

BACKGROUND OF THE INVENTION

The invention relates to a convertible vehicle with a vehicle roof which is movable between a closed position in which it covers an interior vehicle space and an open position in which the vehicle roof is deposited in a storage compartment, which is provided with a cover including an operating mechanism for pivoting the cover open while moving it toward the rear of the vehicle.

DE 199 48 746 A1 discloses a vehicle roof wherein, for the transfer of the roof from the closed to the open position, the front roof part is first moved, by means of a telescopic guide structure, below the rear roof part whereupon, in a subsequent step, the front and the rear roof parts are moved together as a packet into the trunk of the vehicle. For depositing the roof top packet, the trunk lid covering the trunk is pivoted open about a pivot axis which is disposed adjacent the vehicle interior whereby an opening is provided between the trunk lid and the vehicle body through which the roof parts can be introduced into the trunk. When the roof parts have been deposited, the trunk lid can again be closed.

The pivot axis of the trunk lid is disposed at the end of the trunk next to the vehicle interior. The lid is opened from the rear of the vehicle for depositing the roof and also for loading and unloading the trunk.

In order to ensure a sufficiently large access space between the front edge of the trunk lid adjacent the interior of the vehicle and the vehicle body for moving the roof into, and out of, the trunk, the front edge of the trunk lid must be displaced to the rear; otherwise, the opening between the front edge of the trunk lid and the vehicle body is insufficient for a collision-free movement of the vehicle roof into, or out of, the trunk. This requires either a trunk lid, which is relatively short in the longitudinal vehicle direction or long support arms between the pivot axis at the vehicle body and the rear lid. In the first case, that is, when the trunk lid is narrow, only a small part of the trunk space can be covered by the rear lid so that also the access to the trunk is relatively small when the trunk lid is opened. In the second case—with long support arms—the rear lid opens in a wide path of movement and therefore requires a large unobstructed space.

Another convertible vehicle is known from EP 949 103 A1, which discloses a rear trunk lid, which can be pivoted open for depositing the vehicle roof and which can also be moved toward the rear of the vehicle when being pivoted open. The trunk lid operating mechanism comprises a main arm by way of which the trunk lid is pivotally supported on the vehicle body and which is operated by a hydraulic operating element. At its end facing the vehicle interior, the trunk lid is supported by a slide track. When the main support arm is pivoted upwardly by the hydraulic operating element, the end of the trunk adjacent the vehicle interior slides backward in the track and, at the same time, is pivoted open by the pivot movement of the main arm. In this way, an open access area is provided between the trunk lid and the vehicle interior through which the vehicle roof can be moved either to be deposited in the storage compartment or to be removed therefrom.

In its open position, however, the trunk lid extends far back beyond the rear end of the vehicle because of its linear displacement toward the rear so that the trunk lid may collide with an object that may be present behind the vehicle.

DE 198 00 156 A1 discloses a rear trunk lid covering a storage compartment for a vehicle roof which is connected to the vehicle body by a four-link operating mechanism. For opening the storage compartment, the trunk lid is raised at its end adjacent the vehicle interior. Since a four-link operating mechanism provides not only for a pivot movement but also for a longitudinal displacement of the lid, the rear end of the lid may move beyond the rear contour of the vehicle.

Although this can be prevented by mounting the lid operating mechanism to the vehicle body near the vehicle passenger compartment, such an arrangement would limit the access opening to the roof storage compartment behind the passenger compartment.

It is the object of the present invention to provide a convertible vehicle, whose vehicle roof can be deposited in a storage compartment, with relatively inexpensive design features, wherein, during opening and closing of the roof, all components of the vehicle and its roof remain within the confinement of the vehicle body contour.

SUMMARY OF THE INVENTION

In a convertible vehicle including a roof which is movable between a closed position, in which the roof covers an interior vehicle space, and an open position, in which the roof is deposited in a storage compartment behind the passenger compartment of the vehicle, that is covered by a rear lid, an operating mechanism for opening and closing the rear lid is provided which includes front and rear pivot arms pivotally mounted to the vehicle body, a coupling arm pivotally connected to the pivot arms and first and second links, each of which has one end pivotally connected to the rear lid and the first link is pivotally connected with its other end to the coupling arm while the second link forms an extension of the rear pivot arm.

With this arrangement, in which the trunk lid is pivotally connected to the vehicle body by an operating linkage which includes a coupling arm, pivot arms and links, which are pivotally connected to the vehicle body, and, respectively, to the trunk lid and all are connected to the coupling arm by pivot joints, the trunk lid operating mechanism includes only pivot joints. In contrast to the state of the art, no slide track is needed for the operation of the trunk lid.

The rear trunk lid operating mechanism including exclusively links, arms, pivot joints and a coupling arm permits, even without guide tracks, a wide opening of the rear lid wherein, in its open position, the rear lid extends upwardly at a steep angle. In its open position, the rear lid is disposed within the contour of the vehicle, that is, it does not extend beyond the rear end of the vehicle although it is moved toward the rear. The access opening generated between the front edge of the rear lid and the passenger compartment is therefore sufficient to move the vehicle roof through the access opening into the roof storage compartment without colliding with other parts.

Since one of the pivot links of the trunk lid is an integral part of one of the pivot arms requiring only a single pivot joint at the coupling arm, the trunk operating mechanism consists of a seven-joint operating mechanism, that is, it includes seven joints, namely two joints each at the vehicle body and the trunk lid and three joints at the coupling arm interconnecting the links and arms. The two outer joints of the coupling arm are connected respectively, to a vehicle support arm and a trunk lid link and the intermediate joint is pivotally connected to the arm extending between the trunk lid and the vehicle body. In the embodiment with a seven joint operating mechanism, only one of the pivot arms needs to be actuated at the vehicle body side for a predetermined kinematic opening and closing movement of the rear trunk lid.

The transfer movement to a steeply open position with a sufficiently large access opening can be enhanced by a special selection of the geometric relationship of the arms and links and the coupling arm. Preferably, the link and the arm connected to the trunk lid are connected to the trunk lid at a relatively small distance from each other whereas the connecting points of the two arms two arms mounted on the vehicle body are pivotally supported at a significantly larger distance from each other so that spacing between the body-side pivot joints is much greater, that is at least five times greater than the spacing of the trunk lid joints. Also, the pivot joints on the coupling arm are so arranged that the outer pivot joint, which is linked to the vehicle body, has a much greater distance from the intermediate joint than the outer coupling arm joint which is linked to the trunk lid. It may furthermore be advantageous if the pivot arm, which is actuated by an operating member for the automatic raising and lowering of the trunk lid, is the arm extending to the lid and is significantly longer than the second vehicle body pivot arm, in order to provide for a good lever action for the initiation of the pivot movement of the linkage. The steep orientation of the trunk lid in its open position may be enhanced by a bent in the coupling arm wherein the bend-over point is disposed in the area of the intermediate common pivot joint and the end of the coupling arm is bent over toward the trunk lid.

The rear lid may at the same time be a trunk lid, which covers the vehicle trunk as well as the roof storage compartment and which is opened in the same way for access to the vehicle roof storage compartment and to the trunk space.

If the rear lid is at the same time the trunk lid, the roof storage compartment is part of the trunk space so that the trunk space is substantially enlarged when the vehicle roof is in a closed position.

The invention will become more readily apparent from the following description of a preferred embodiment thereof on the basis of the accompanying drawings.

DESCRIPTION OF A PREFERRED EMBODIMENT

Figure 1:
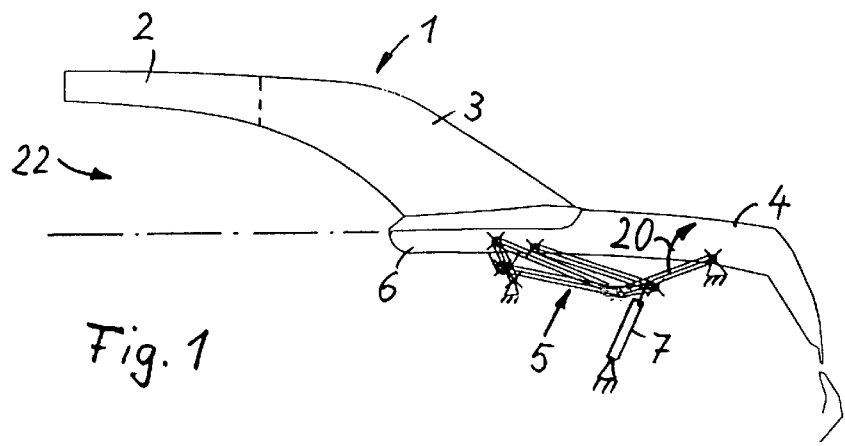
FIG. 1 is a side view of a convertible vehicle with a closed vehicle roof and a closed rear lid.

In the figures, identical parts are designated by the same reference numerals.

The vehicle roof 1 as indicated in FIG. 1 is a hardtop vehicle roof, which consists of two rigid parts 2 and 3, which are kinematically coupled and which can be moved from the closed position as shown, in which they cover the interior vehicle space 22, to an open or storage position, in which the vehicle roof 1 is deposited in a storage compartment behind the interior vehicle space 22. The storage compartment, which is preferably part of the trunk, is covered by a rear lid 4 in the closed position as well as in the open or storage position of the vehicle roof 1. For the transfer of the vehicle roof 1 to and from the storage compartment, the rear lid 4 is opened to provide access to the vehicle roof storage compartment.

Figure 3:
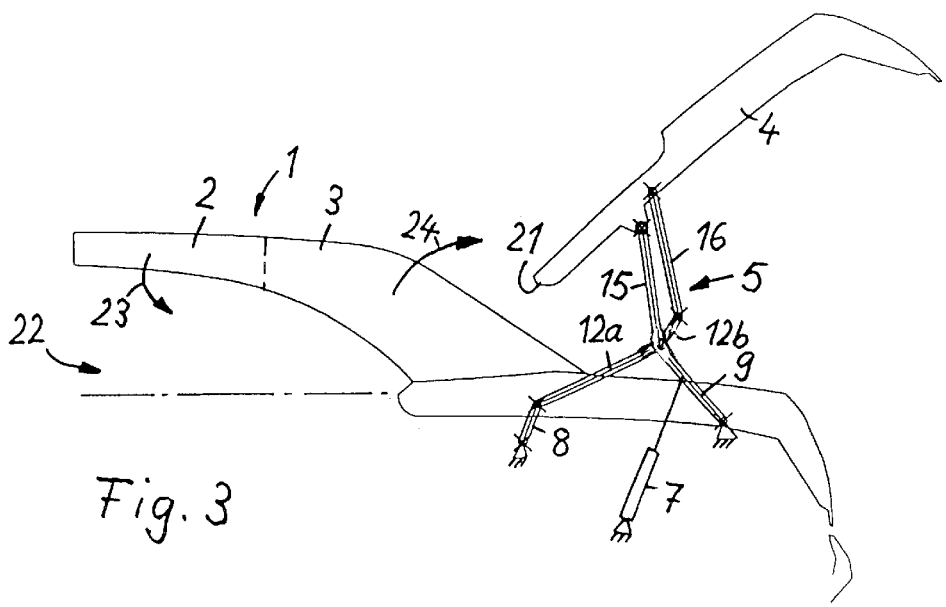
FIG. 3 shows the vehicle with the rear lid fully opened providing for an access opening between the front edge of the rear lid and the vehicle interior for transferring the vehicle roof to and from the vehicle roof storage compartment.

The rear lid 4 is supported on the vehicle body 6 by a rear lid operating mechanism 5 and is operable by a hydraulic operating member 7, which is also supported on the vehicle body 6, between the closed position as shown in FIG. 1 and the open position as shown in FIG. 3. The rear lid operating mechanism 5 comprises a plurality of arms and links which are pivotally connected to the vehicle body 6 and partly to the rear lid 4 and a coupling arm 12 which is disposed between the various arms and links.

Figure 2:
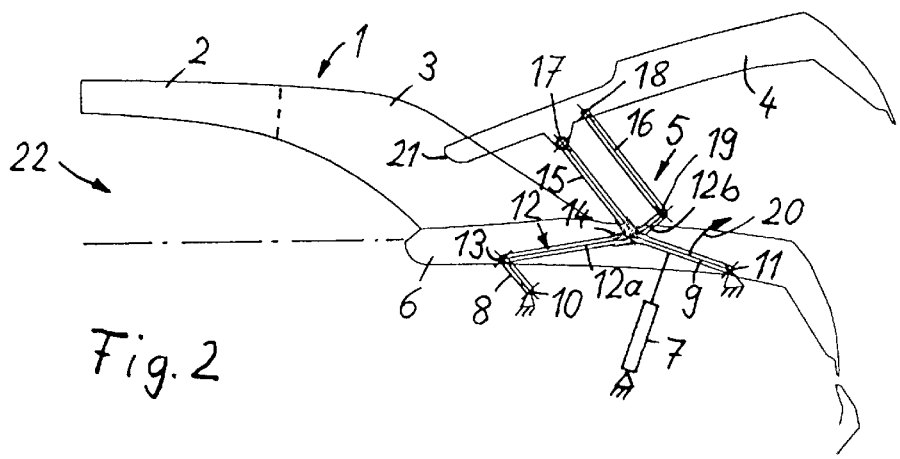
FIG. 2 shows the vehicle with the rear lid partially opened.

FIGS. 2 and 3 show the rear lid operating mechanism 5 in detail. The rear lid operating mechanism 5 comprises two arms 8 and 9 which are pivotally connected to the vehicle body and of which the front arm 8, which is disposed next ot the interior space of the vehicle, is shorter and is mounted to the vehicle body by a pivot joint 10. The rear arm 9, which is spaced from the front arm 8 rearwardly toward the rear end of the vehicle is pivotally connected to the vehicle body by another pivot joint 11 and is actuated by the hydraulic operating member 7. The two body-side pivot arms 8 and 9 are connected at their ends remote from the vehicle body to a coupling arm 12 by way of a first pivot joint 13, which is arranged at the front end of the coupling arm 12 and a second pivot joint 14, which is arranged at an intermediate area of the coupling arm 12. The two vehicle body-side pivot arms 8 and 9 and the coupling arm 12 interconnecting the pivot arms 8 and 9 form a four joint operating mechanism with the pivot joints 10, 13, 14, and 11.

The rear lid operating mechanism 5 further includes two rear lid-side links 15 and 16, which are connected to the rear lid 4 by way of pivot joints 17 and 18. At its end remote from the rear lid, the link 16 is pivotally connected to the coupling arm 12 by way of pivot joint 19. The link 15 is an integral part of the pivot arm 9 and is therefore connected to the coupling arm 12 by the same pivot joint 14, by which the vehicle body-side pivot arm 9 is connected to the coupling arm 12.

The outer pivot joints 13 and 19 and the intermediate pivot joint 14 of the coupling arm 12 divide the coupling arm 12 into two sections 12a and 12b. In the area of the intermediate pivot joint 14, the coupling arm 12 is bent toward the rear lid preferably at an angle of less than 30° so that the section 12b is inclined toward the rear lid 4. The first section 12a of the coupling arm 12, which extends between the pivot joint 13 of the vehicle body-side pivot arm 8 and the common pivot joint 14, is significantly larger than the second section 12b, which extends between the intermediate joint 14 and the pivot joint 19 of the rear link 16.

When the rear lid operating mechanism is actuated by the hydraulic operating member 7, the vehicle body-side rear operating arm 9 is pivoted about its body-side pivot joint 11 in the direction of the arrow 20, whereby the rear lid 4 is raised from its closed position and is pivoted to its upwardly extending open position as shown in FIG. 3. The transfer movement from the closed position to the open position is preferably controlled depending on the actual position of the vehicle roof in order to achieve a coupled movement of the rear lid and the vehicle roof. The rear lid is herein pivoted open at the beginning of a transfer movement of the vehicle roof from the closed to the open, that is, the storage position and vice versa in order to provide a sufficiently large access opening between the front edge 21 of the rear lid 4 and the vehicle interior to permit movement of the vehicle roof 1 therethrough.

When the rear lid has reached its maximum open position according to FIG. 3, in which the access opening between the rear lid front edge 21 and the vehicle interior 22 is also at its maximum, the roof parts 2 and 3 of the vehicle roof 1 are pivoted in the directions of the arrows 23, 24 (FIG. 3) for the movement of the vehicle roof into its open or storage position through the access opening between the front edge 21 of the rear lid 4 and the vehicle interior 22. When the vehicle roof 1 has been deposited in the storage compartment, the rear lid 4 can again be closed automatically by the operating member 7.

For closing the vehicle roof, the whole procedure is reversed. First, the rear lid 4 is raised from its closed position to its maximum open position by activation of the rear lid operating mechanism 5. Then the vehicle roof is raised from its storage position and is moved through the access opening between the front edge 21 of the rear lid 4 and the vehicle interior 22 and to its closed position on top of the vehicle. When the vehicle top is again in its closed position, the rear lid 4 is again closed. The rear lid 4 can also be opened to provide access to the vehicle trunk independently of the momentary position of the vehicle roof. To achieve this, the operating member 7 can be activated independently of the vehicle roof 1.

What is claimed is:

1. A convertible vehicle including a vehicle body with a vehicle roof, which is movable between a closed position, in which said vehicle roof covers an interior vehicle space, and an open position, in which said vehicle roof is deposited in a storage compartment disposed behind the interior vehicle space, a rear lid supported on said vehicle body to cover said storage compartment and an operating mechanism for opening and closing said rear lid, said operating mechanism including a front and a rear pivot arm each being pivotally supported with one end by front and, respectively, rear end pivot joints on said vehicle body, a coupling arm, which has front, rear and intermediate pivot joints, with said front and rear pivot arms being pivotally connected respectively to said front and intermediate pivot joints of said coupling arm, and a first link having opposite ends and being pivotally connected with one end to said rear lid at a first location and with the other end to said rear pivot joint of said coupling arm and a second link having one end pivotally connected to said rear lid at a second location spaced from said first location and being an integral part of said rear pivot arm and connected to said coupling arm by said intermediate pivot joint disposed between the front and rear pivot joints of the coupling arm with the distance between the front pivot joint of the coupling arm, which is linked to the vehicle body, and the intermediate pivot joint being larger than the distance between the rear pivot joint, which is linked to the rear lid, and the intermediate pivot joint.

2. A convertible vehicle according to claim 1, wherein the distance between said first and second locations of said first and second links with said rear lid have a smaller distance from each other than the front and rear end pivot joints with which the front and rear pivot arms are connected to said vehicle body.

3. A convertible vehicle according to claim 1, wherein said rear pivot arm, which is connected to said vehicle body, extends to said rear lid and is connected to said coupling arm by said intermediate pivot joint.

4. A convertible vehicle according to claim 1, wherein said coupling arm is bent over toward said rear lid at said intermediate pivot joint.

5. A convertible vehicle according to claim 1, wherein an operating member is connected to said rear pivot arm and is pivotally connected to said vehicle body for actuating said operating mechanism.

6. A convertible vehicle according to claim 5, wherein said operating member is connected to said rear pivot arm which extends to said lid.

7. A convertible vehicle including a vehicle body with a vehicle roof, which is movable between a closed position in which the roof covers an interior vehicle space, and an open position, in which said vehicle roof is deposited in a storage compartment disposed behind the interior vehicle space, a rear lid supported on said vehicle body to cover said storage compartment and an operating mechanism for opening and closing said rear lid, said operating mechanism including a front and a rear pivot arm each being pivotally supported with one end on said vehicle body, a coupling arm to which said front and rear pivot arms are pivotally connected, and a first link pivotally connected with one end to said rear lid and with its other end to an end pivot joint of said coupling arm and a second link pivotally connected with one end to said rear lid and being an integral part of said rear pivot arm and connected to said coupling arm by an intermediate joint disposed between the end joints of the coupling arm with a distance between an end pivot joint of the coupling arm, which is linked to the vehicle body, and the intermediate pivot joint being larger than the distance between an opposite end pivot joint, which is linked to the rear lid, and the intermediate pivot joint.

8. A convertible vehicle according to claim 1, wherein said vehicle roof is a hardtop roof including at least two rigid roof parts.

* * * * *